United States Patent [19]
Miller

[11] Patent Number: 5,361,377
[45] Date of Patent: Nov. 1, 1994

[54] APPARATUS AND METHOD FOR PRODUCING ELECTRICAL POWER

[76] Inventor: John A. Miller, 804 N. 2nd St., Burlington, Kans. 66839

[21] Appl. No.: 868,183

[22] Filed: Apr. 14, 1992

[51] Int. Cl.$^5$ ............................................. G21C 7/32
[52] U.S. Cl. .................................. 376/211; 376/911; 376/318
[58] Field of Search ................ 376/211, 318, 911; 60/707, 518, 203.1, 644, 658; 976/DIG. 166, DIG. 292

[56] References Cited

U.S. PATENT DOCUMENTS

| | | | |
|---|---|---|---|
| 3,242,053 | 3/1966 | Sanders et al. | 376/211 |
| 3,873,817 | 3/1975 | Liang | 235/151.21 |
| 4,007,595 | 2/1977 | Braytenbah et al. | 60/644 |
| 4,302,291 | 11/1981 | Severs et al. | 376/293 |
| 4,358,930 | 11/1982 | Pope et al. | 60/647 |

*Primary Examiner*—Donald P. Walsh
*Assistant Examiner*—Meena Chelliah
*Attorney, Agent, or Firm*—John W. Carpenter

[57] ABSTRACT

A method for producing electrical power from steam generated by a nuclear reactor comprising the steps of: providing a nuclear reactor engaged to a steam generator for generating steam when heated aqueous product is passed therethrough; and passing heated aqueous product through the steam generator to produce steam. The method additionally comprises passing the produced steam through a fossil fired or steam to steam superheater to superheat the produced steam; and passing the superheated produced steam through a first turbine to expand the superheated produced steam and produce steam. The produced steam from the first turbine is subsequently reheated to obtain a reheated steam. The obtained reheated steam is then passed through a second turbine coupled to a generator in order to expand the obtained reheated steam and generate electrical power with the generator. An apparatus to accomplish the method for producing electrical power from steam generated by a nuclear reactor.

8 Claims, 10 Drawing Sheets

APPARATUS AND METHOD FOR PRODUCING ELECTRICAL POWER

FIELD OF THE INVENTION

This invention is related to the production of electrical power or energy. More specifically, the present invention provides an apparatus and method for producing electrical power with steam generated by a nuclear reactor.

DESCRIPTION OF THE PRIOR ART

Conventional methods of electrical power production utilize pressurized steam generation and a subsequent pressure drop for rotating a steam turbine/generator to produce electricity. An essential part of the system cycle is to condense the exiting turbine steam back into water to permit repressuring the system. In turn, the water is again heated into steam, which requires a large quantity of heat for a transformation of state from water to steam, that is, the Heat of Vaporization.

In a conventional nuclear-fueled system, water is heated and the water is transformed into saturated steam. Since saturated steam is highly erosive, higher cost 1800 RPM turbines must be used. Reheat of the steam flow to a L.P. (low pressure) Turbine is by use of main saturated steam. The foregoing are disadvantages of the nuclear fueled system. The main advantage is the low cost of the fuel, that is, cost per BTU.

In a conventional fossil fired system the water is heated and the water is transformed into saturated steam. The saturated steam is in turn heated to a higher temperature (superheated) thus permitting greater power production for a given cycle fluid flow. Also with the use of superheated steam less costly 3600 RPM turbines are used. Reheat of the steam for L.P. turbine flow is accomplished by use of a fossil fired reheater. The main advantage of the fossil fired system above the nuclear fueled system is the system has smaller fluid flow for a given output since more heat can be added. This in turn reduces equipment sizes and permits the use of 3600 RPM steam turbines. The main disadvantage is the higher cost of fossil fuel, that is, cost per BTU.

A patentability investigation was conducted and the following U.S. Pat. Nos. by Nos. were discovered:
  3,329,575 entitled: POWER PLANT APPARATUS to Burback et al
  3,575,002 entitled: COMBINATION FOSSIL FUEL AND SUPER-HEATED STEAM NUCLEAR POWER PLANT to Vuia.
  3,583,156 entitled: GAS TURBINE POWERPLANTS to Schabert.
  3,826,091 entitled: PROCESS FOR CONVERTING HEAT PRODUCED BY A NUCLEAR REACTOR TO ELECTRICAL ENERGY to Stahl.
  3,894,394 entitled: HTGR POWER PLANT HOT REHEAT STEAM PRESSURE CONTROL SYSTEM to Braytenbah et al.
  4,015,430 entitled: ELECTRIC POWER PLANT AND TURBINE ACCELERATION CONTROL SYSTEM FOR USE THEREIN to Braytenbah et al.
  4,336,105 entitled: NUCLEAR POWER PLANT STEAM SYSTEM to Silvestri, Jr.
  4,530,814 entitled: APPARATUS FOR SUPERHEATING STEAM to Schluderberg.

U.S. Pat. No. 3,329,575 to Burbach et al deals with the problem of a separately fired superheater for a typical 600 PSI nuclear steam cycle. The patent indicates the problem can be solved by increasing the steam pressure from 600 PSI to 1000 PSI; that is, the nuclear steam generator steam is increased to a pressure of 1000 PSI by a compressor and then is piped to the fossil fired superheater. This is an inefficient set-up but confirms the need for higher pressures in the superheater to assure a superheater of reasonable size.

U.S. Pat. No. 3,575,002 teaches that a separately fired superheater has problems relative to tube design in and around the "firebox" which results in tube temperatures exceeding the temperature limit of existing material. The patent indicates the problem can be solved by placing the superheater in a boiler which would be utilized for both a conventional fossil plant and the nuclear cycle superheater; that is, a separate fossil fuel plant and separate superheated steam nuclear power plant with the steam being heated in the fossil fuel plant's boiler.

U.S. Pat. No. 4,530,814 to Schluderberg provides for a design of a reheater to add heat to the nuclear steam flow between the high and low pressure turbine of a nuclear power plant. The heat added comes from a fossil fired steam circuit; that is, fossil heated vapor heats the nuclear system cycle's steam. This patent is not related to the nuclear-fossil integrated designs presented in this invention.

None of the foregoing prior art patents teach or suggest the particular apparatus and method of the present invention. What is needed and what has been invented by me is an apparatus and method for producing electrical power or energy without the deficiencies associated with the foregoing prior art.

SUMMARY OF THE INVENTION

The present invention accomplishes its desired objects by broadly providing a method for producing electrical power from steam generated by a nuclear reactor comprising the steps of:
  (a) providing a nuclear reactor engaged to a steam generator for generating steam when heated aqueous product is passed therethrough;
  (b) passing heated aqueous product through the steam generator of step (a) to produce steam;
  (c) passing the produced steam of step (b) through a superheater to superheat the produced steam, preferably to produce steam having an enthalpy above about 1450 BTU per lb.;
  (d) passing the superheated produced steam of step (c) through a first turbine to expand the superheated produced steam and produce steam, preferably producing steam having an enthalpy above about 1250 BTU per lb.;
  (e) reheating the produced steam of step (d) to obtain a reheated steam, preferably obtaining a reheated steam having an enthalpy above about 1470 BTU per lb.;
  (f) passing the obtained reheated steam of step (e) through a second turbine coupled to a generator in order to expand the obtained reheated steam and generate electrical power with the generator.

The method additionally comprises recovering expanded steam from the second turbine, said recovered expanded steam from the second turbine preferably having an enthalpy greater than about 1050 BTU per lb.; condensing the recovered expanded steam into an aqueous product; passing the aqueous product through a first pump to pump the aqueous product to produce a pumped aqueous product; passing the pumped aqueous product through at least one first heater to produce an aqueous product having an elevated temperature, an elevated pressure and elevated enthalpy; passing the aqueous product having an elevated temperature, pressure and enthalpy through a second pump; and passing subsequently the aqueous product from the second pump through at least one second heater to produce the heated aqueous product which is for being passed through the steam generator.

The present invention also accomplishes its desired objects by broadly providing an apparatus for producing electrical power comprising in combination a nuclear reactor engaged to and communicating with a steam generator; a superheater (i.e. fossil fired or steam to steam superheater) engaged to and communicating with the steam generator; a first turbine engaged to and communicating with the superheater; a reheater engaged to and communicating with the first turbine; and a second turbine coupled to a generator and engaged to and communicating with the reheater.

It is therefore an object of the present invention to provide a method for producing electrical power from steam generated by a nuclear reactor.

It is another object of the present invention to provide an apparatus for accomplishing the method for producing electrical power from steam generated by a nuclear reactor.

These, together with the various ancillary objects and features which will become apparent to those skilled in the art as the following description proceeds, are attained by this novel method and apparatus, a preferred embodiment being shown with reference to the accompanying drawings, by way of example only wherein:

DETAILED DESCRIPTION OF THE INVENTION

Figure 1:
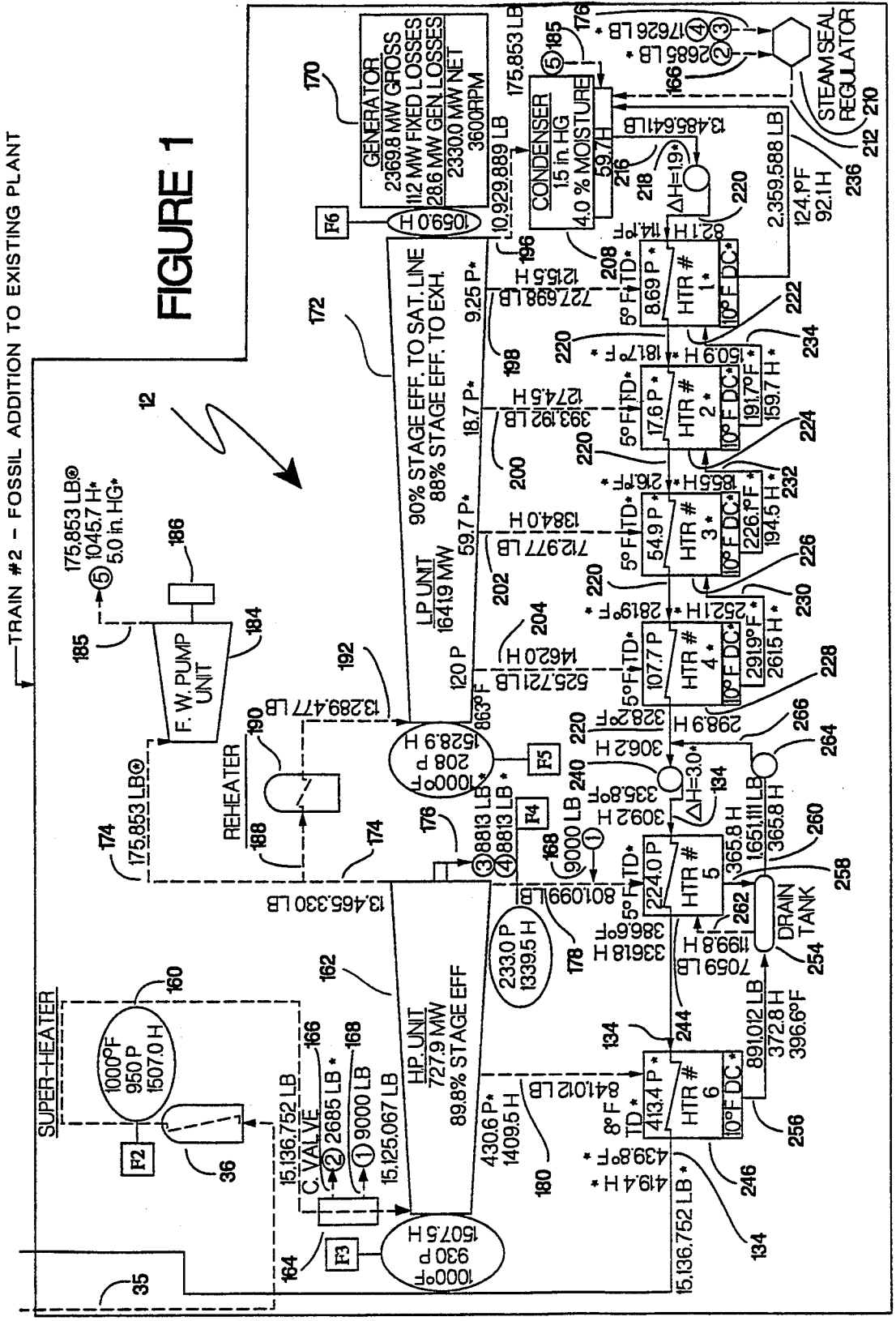
FIG. 1 is schematic diagram of one embodiment of the present invention.
Figure 1A:
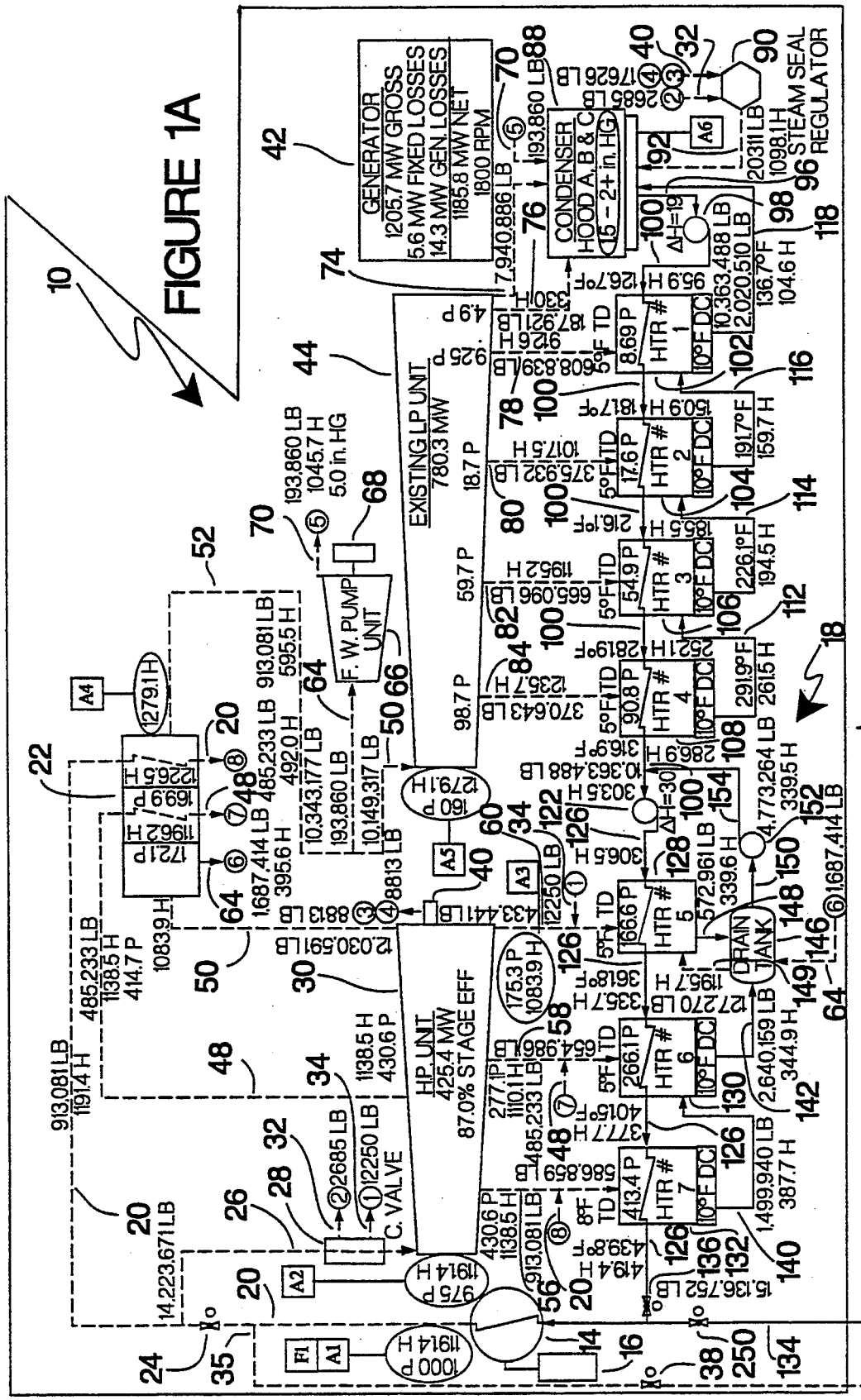

Referring in detail now to the drawings wherein similar parts of the invention are identified by like reference numerals, and initially to the embodiment of the invention depicted in FIG. 1, there is seen a conventional nuclear generating plant, generally illustrated as 10 (i.e. Train #1) interconnected to and communicating with an improved addition, generally illustrated as 12 (i.e. Train #2) and operating in parallel with the nuclear generating plant 10. The improved addition 12 is to generally operate independent of the nucclear generating plant 10, and vice versa. During peak or high demand periods, the nuclear generating plant 10 is to be secured or disconnected communicatively from the improved addition 12 to operate independently for the production of electrical power or electricity. During low demand cycles, the improved addition 12 is to be secured or disconnected communicatively from the nuclear generating plant 10 for the independent production of electrical power or energy or electricity.

The nuclear generating plant 10 in FIG. 1 comprises a steam generator 14 engaged to and communicating with a nuclear reactor 16 for generating steam therein when a heated aqueous product is passed therethrough. The heated aqueous product is produced by a plurality of heaters, generally illustrated as 18 and will be further explained in detail below. Conduit 20 extends from the steam generator 14 to a heat exchanger 22. A valve 24 controls the flow of steam through conduit 20. Conduit 26 connects to and communicates with conduit 20 downstream of valve 24 for conducting steam to a turbine (i.e. a high pressure (H.P.) turbine) 30. A control valve 28 in line or conduit 26 controls the flow of steam through conduit 26 and is capable of venting or exiting steam through conduits 32 and 34 which respectively connect to and communicate with a steam seal regulator and a heater, all to be identified below. Conduit 20 also connects to and communicates with a conduit 35 that extends to and communicates with the improved addition 12, more specifically to a superheater 36 (i.e. a fossil fired or steam to steam superheater) of the improved addition 12. Conduit 35 contains a valve 38 for controlling the flow of steam therethrough. To isolate and operate the nuclear generating plant 10 independent of the improved addition 12, valve 38 is closed and valve 24 is opened, allowing steam to flow through conduit 20 and 26 and pass respectively into heat exchanger 22 and H.P. turbine 30. H.P. turbine 30 has a shaft (not shown) that is coupled to a generator 42. A L.P. (low pressure) turbine 44 is also engaged to the same shaft for further driving and operating the generator 42 to produce electricity. As steam enters the turbine 30 to drive the same, an expansion of steam occurs. Expanded steam can exit the turbine 30 through the following conduits or lines: conduit 40, conduit 48, conduit 50, conduit 56, conduit 58 and conduit 60. Expanded steam passes through conduit 50 to enter the moisture separator/reheater 22 where steam passing through conduits 20 and 48 heats the steam. Condensate leaves the moisture separator 22 through conduit 64. Heated steam leaves the reheater 22 through a conduit 62 that connects to and communicates with the L.P. turbine 44. Some of the heated steam from the reheater 22 and passing through conduit 62 is removed through a conduit 64 to contact a feedwater turbine 66 for driving and operating a feedwater pump 68. Expanded steam leaves the feedwater turbine through conduit 70. When steam enters low pressure turbine 44, expansion of the steam takes place within turbine 44. Expanded steam leaves the turbine 44 through the following conduits or lines: conduit 74; conduit 76; conduit 78; conduit 80., conduit 82; and conduit 84. Steam passing through conduit 74, as well as steam passing through conduit 70, enters a condenser 88 to condense the steam. A steam seal regulator 90 accepts steam from conduits 32 and 40. Conduit 92 transports steam from the steam seal regulator 90 to the condenser 88. Condensate leaves the condenser 88 through the conduit 96 where pump 98 pumps the condensate through conduit 100 to introduce the same into and/or through a heater 102. As shown in the upper part of FIG. 1, conduit 100 extends through heater 102, as well as through heaters 104, 106 and 108. Each of the heaters 102, 104, 106 and 108 are basically a heat exchanger and produce an aqueous product that is passed, conducted and/or conveyed to the immediate preceeding, contiguous heater or unit. More specifically, heater 108 produces an aqueous product that is conveyed to heater 106 via line or conduit 112. Similarly, heater 106 and heater 104 respectively produce an aqueous product that is conveyed to heaters 104 and 102 via line or conduit 114 and line or conduit 116 respectively. The aqueous product produced by heater 102 is conveyed to the condenser 88 via conduit 118. Expanded steam leaving the turbine 44 via conduits 78, 80, 82 and 84 is conveyed directly to heaters 102, 104 106 and 108, respectively. After leaving heater 108 conduit 100 connects to a pump 122 for pumping heated aqueous product (i.e. water) through a conduit 126 which extends through heaters 128, 130, and 132 for further heating the heated aqueous product (i.e. water) for passing or conveying further heated aqueous product into conduit 134. Conduit 126 has a valve 136 for regulating the flow of the further heated aqueous product therethrough. Expanded steam leaving the turbine via conduits 60, 58 and 56 is conveyed directly to heaters 128, 130 and 132, respectively. Conduits 20, 48 and 34 convey and introduce aqueous product into conduits 56, 58, and 60 respectively. As was seen for heaters 102, 104, 106 and 108, heaters 128, 130 and 132 are each also a heat exchanger and produce an aqueous product that is passed, conducted and/or conveyed to the immediate preceeding, contiguous heater or unit. More particularly, heater 132 and 130 respectively produce an aqueous product that is conveyed to heater 130 and drain tank 146 via line or conduits 140 and 142 respectively. Heater 128 produces an aqueous product that is conveyed to the drain tank 146 via conduit 148. Drain tank 146 also receives aqueous product from conduit 64. Product leaves drain tank 146 through conduits 149 and 150 which connect to and communicate with heater 128 and a pump 152 respectively. A conduit 154 connects from pump 152 to conduit 100. Aqueous product is pumped by pump 152 through conduit 154 to conduit 100.

The improved addition 12 in FIG. 1 comprises as previously indicated the superheater 36. A conduit 160 leads from the superheater 36 to a high pressure (H.P.) turbine 162. A control valve 164 in conduit 160 controls the flow of steam through conduit 160 and is capable of exiting steam through conduits 166 and 168 which respectively connect to and communicate with a steam seal regulator and a heater, all to be identified hereafter. H.P. turbine 162 has a shaft (not shown) that is coupled to a generator 170 . A L.P. (low pressure) turbine 172 is also engaged to the same shaft for further driving the generator 170 to produce electricity. As superheated steam enters the turbine 162 for operating and/or driving the same, an expansion of steam occurs. After driving the turbine 162, expanded steam exits the turbine 162 through the following conduits or lines: conduit 174, conduit 176, conduit 178, and conduit 180. Expanded steam passes through conduit 174 to enter a feedwater turbine 184 for driving and operating a feedwater pump 186. Expanded steam leaves the feedwater turbine 184 through conduit 185. A conduit 188 connects to and communicates with conduit 174 for conducting expanded steam from conduit 174 to a reheater 190. Conduit 192 conveys reheated expanded steam from the reheater 190 to the turbine 172. When steam enters the low pressure turbine 172, expansion of the steam takes place within turbine 172. Expanded steam leaves the turbine 172 through the following conduits or lines: conduit 196; conduit 198; conduit 200; conduit 202; and conduit 204. Steam passing through conduit 196, as well as steam passing through conduit 185, enters a condenser 208 to condense the steam. A steam seal regulator 210 accepts steam from conduits 166 and 176. Conduit 212 transports steam from the steam seal regulator 210 to the condenser 208. Condensate leaves the condenser 208 through the conduit 216 where pump 218 pumps the condensate through conduit 220 to introduce the same into and/or through a heater 222. As shown in the lower part of FIG. 1, conduit 220 extends through heater 222, as well as through heaters 224, 226 and 228. Each of the heaters 222, 224, 226 and 228 are basically a heat exchanger and produce an aqueous product that is passed, conducted and/or conveyed to the immediate preceeding, contiguous heater or unit. More specifically, heater 228 produces an aqueous product that is conveyed to heater 226 via line or conduit 230. Similarly, heater 226 and heater 224 respectively produce an aqueous product that is conveyed to heaters 224 and 222 via line or conduit 232 and line or conduit 234 respectively. The aqueous product produced by heater 222 is conveyed to the condenser 208 via conduit 236. Expanded steam leaving the turbine 172 via conduits 198, 200, 202 and 204 is conveyed directly to heaters 222, 224 226 and 228, respectively. After leaving heater 228 conduit 220 connects to a pump 240 for pumping heated aqueous product (i.e. water) through the conduit 134 which extends through heaters 244 and 246 for further heating the heated aqueous product (i.e. water) and for passing or conveying further heated aqueous product into the steam generator 14. Conduit 134 has a valve 250 for regulating the flow of the further heated aqueous product therethrough. Expanded steam leaving the turbine 162 via conduits 178 and 180 is conveyed directly to heaters 244 and 246 respectively. Conduits 168 conveys and introduces aqueous product into the conduits 178. As was seen for heaters 222,224, 226 and 228, heaters 244 and 246 are each also a heat exchanger and produce an aqueous product that is passed, conducted and/or conveyed to the immediate preceeding, contiguous heater or unit. More particularly, heater 246 and 244 respectively produce an aqueous product that is conveyed to drain tank 254 via line or conduits 256 and 258 respectively. Product leaves drain tank 254 through conduits 262 and 260 which connect to and communicate with heater 244 and a pump 264 respectively. A conduit 266 connects from pump 264 to conduit 220. Aqueous product is pumped by pump 264 through conduit 266 to conduit 220.

Figure 6:
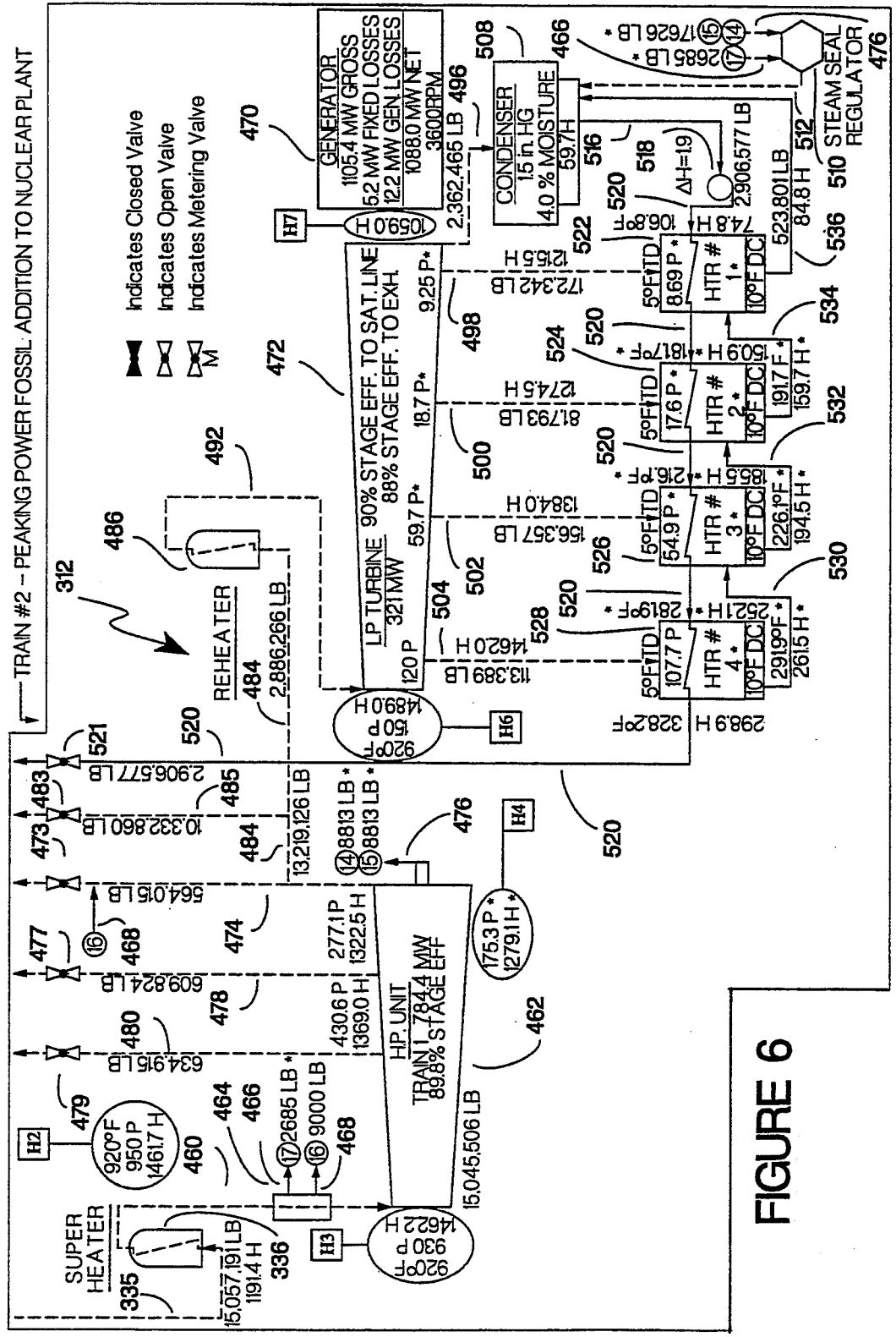
FIG. 6 is schematic diagram of yet another embodiment of the present invention.
Figure 6A:
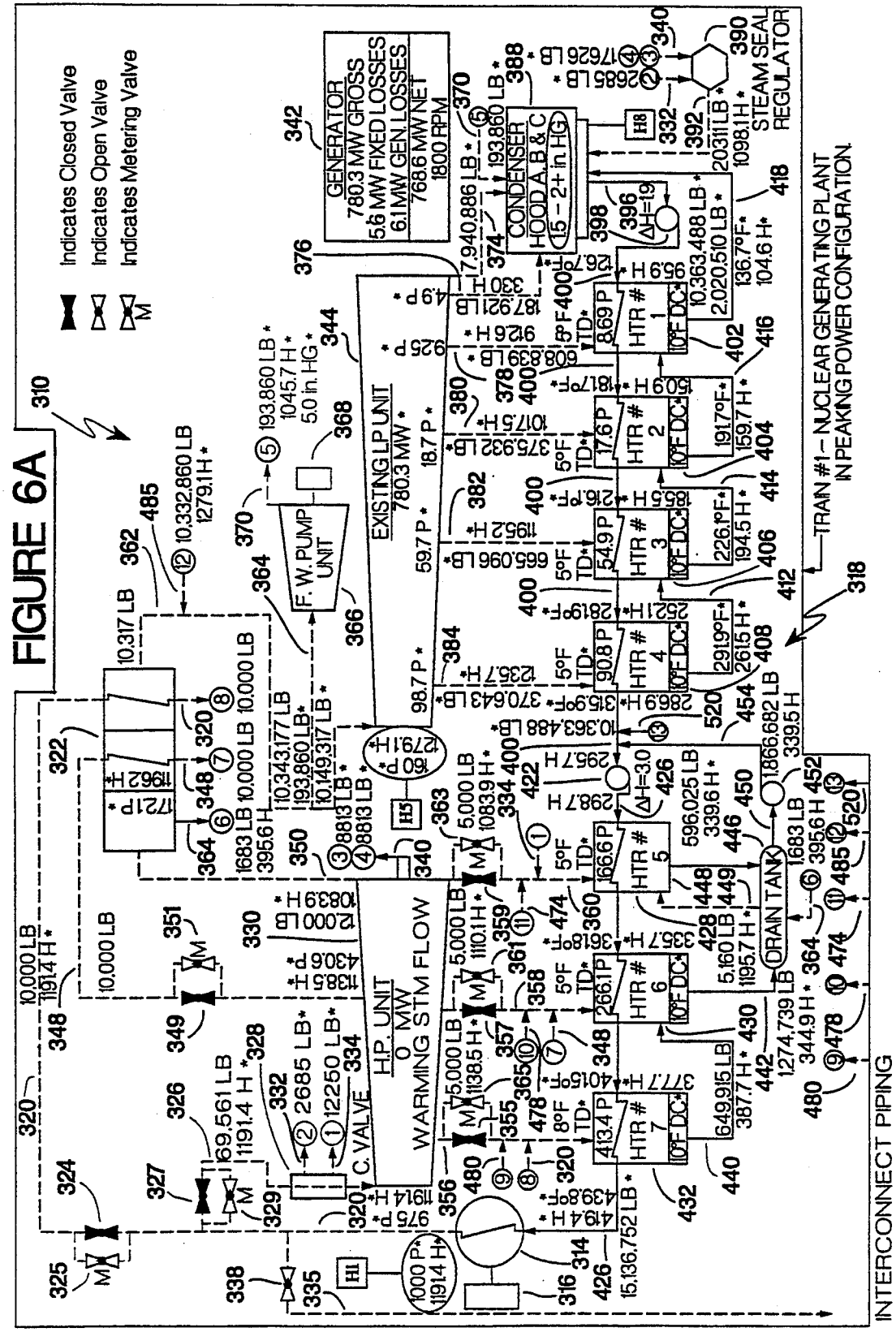

Referring in detail now to the embodiment of the invention depicted in FIG. 6, there is seen a conventional nuclear generating plant, generally illustrated as 310 (i.e. Train #1) interconnected to and communicating with an improved addition, generally illustrated as 312 (i.e. Train #2) and operating in parallel with the nuclear generating plant 310. The nuclear generating plant 310 and the improved addition 312 operate simultaneously for the production of electrical power or electricity.

The nuclear generating plant 310 in FIG. 6 comprises a steam generator 314 engaged to and communicating with a nuclear reactor 316 for generating steam therein when a heated aqueous product is passed therethrough. The heated aqueous product is produced by a plurality of heaters, generally illustrated as 318 and will be further explained in detail below. Conduit 320 extends from the steam generator 314 to a heat exchanger 322. A valve 324 controls the flow of steam through conduit 320. Conduit 326 connects to and communicates with conduit 320 for conducting steam to a turbine (i.e. a high pressure (H.P. turbine) 330. A control valve 328 in line or conduit 326 controls the flow of steam through conduit 326 and is capable of venting or exiting steam through conduits 332 and 334 which respectively connect to and communicate with a steam seal regulator and a heater, all to be identified below. Conduit 326 also has a valve 327 for securing the flow of steam therethrough. Conduit 320 also connects to and communicates with a conduit 335 that extends to and communicates with the improved addition 312, more specifically to a superheater 336 (i.e. a fossil fired or steam to steam superheater) of the improved addition 312. Conduit 335 contains a valve 338 for controlling the flow of steam therethrough. To operate the nuclear generating plant 310 simultaneously with the improved addition 312, valves 338 and 324 are opened along with the opening of metering valves 325 and 329, allowing steam to flow through conduit 320 and 326 and pass respectively into heat exchanger 322 and H.P. turbine 330 to provide warming steam. Steam is also allowed to flow into conduit 335 when valve 338 is opened. H.P. turbine 330 has a shaft (not shown) that is coupled to a generator 342. A L.P. (low pressure) turbine 344 is also engaged to the same shaft for further driving and operating the generator 342 to produce electricity. As steam enters the turbine 330 to drive the same, an expansion of steam occurs and provides warming steam. Expanded steam can exit the turbine 330 through the following conduits or lines: conduit 340, conduit 348, conduit 350, conduit 356, conduit 358 and conduit 360. Conduit 348 contains valves 349 and 351 for regulating the flow of steam therethrough. Similarly, conduits 356, 358 and 360 respectively contain valves 355, 357, 359, 361, 363 and 365 for regulating the flow of steam. Expanded steam passes through conduit 350 to enter the heat exchanger 322 where steam passing through conduits 320 and 348 heats the expanded steam and provides warming steam. Condensate leaves the heat exchanger 322 through conduit 364. Heated steam leaves the heat exchanger 322 through a conduit 362 that connects to and communicates with the L.P. turbine 344. Some of the heated steam from the heat exchanger 322 and passing through conduit 362 is removed through a conduit 364 to contact a feedwater turbine 366 for driving and operating a feedwater pump 368. Expanded steam leaves the feedwater turbine 366 through conduit 370. When steam enters low pressure turbine 344, expansion of the steam takes place within turbine 344. Expanded steam leaves the turbine 344 through the following conduits or lines: conduit 374; conduit 376; conduit 378; conduit 380, conduit 382; and conduit 384. Steam passing through conduit 374, as well as conduit 370, enters a condenser 388 to condense the steam. A steam seal regulator 390 accepts steam from conduits 332 and 340. Conduit 392 transports steam from the steam seal regulator 390 to the condenser 388. Condensate leaves the condenser 388 through conduit 396 where pump 398 pumps the condensate through conduit 400 to introduce the same into and/or through a heater 402. As shown in the upper part of FIG. 6, conduit 400 extends through heater 402, as well as heaters 404, 406 and 408. Each of the heaters 402, 404, 406 and 408 are basically a heat exchanger and produce an aqueous product that is passed, conducted and/or conveyed to the immediate preceeding, contiguous heater or unit. More specifically, heater 408 produces an aqueous product that is conveyed to heater 406 via line or conduit 412. Similarly, heater 406 and heater 404 respectively produce an aqueous product that is conveyed to heaters 404 and 402 via line or conduit 414 and line or conduit 416 respectively. The aqueous product produced by heater 402 is conveyed to the condenser 388 via conduit 418. Expanded steam leaving the turbine 344 via conduits 378, 380, 382 and 384 is conveyed directly to heaters 402, 404 406 and 408, respectively. After leaving heater 408 conduit 400 connects to a pump 422 for pumping heated aqueous product (i.e. water) through a conduit 426 which extends through heaters 428, 430, and 432 for further heating the heated aqueous product (i.e. water) for passing or conveying further heated aqueous product into and through the steam generator 314. Expanded steam leaving the turbine via conduits 360, 358 and 356 is conveyed directly to heaters 428, 430 and 432, respectively. Conduits 320, 348 and 334 convey and introduce aqueous product into conduits 356, 358, and 360 respectively. As was seen for heaters 402, 404, 406 and 408, heaters 428, 430 and 432 are each also a heat exchanger and produce an aqueous product that is passed, conducted and/or conveyed to the immediate preceeding, contiguous heater or unit. More particularly, heaters 432 and 430 respectively produce an aqueous product that is conveyed to heater 430 and drain tank 446 via line or conduits 440 and 442 respectively. Heater 428 produces an aqueous product that is conveyed to the drain tank 446 via conduit 448. Drain tank 446 also receives aqueous product from conduit 364. Product leaves drain tank 446 through conduits 449 and 450 which connect to and communicate with heater 428 and a pump 452 respectively. A conduit 454 connects from pump 452 to conduit 400. Aqueous product is pumped by pump 452 through conduit 454 to conduit 400.

The improved addition 312 in FIG. 6 comprises as previously indicated the superheater 336. A conduit 460 leads from the superheater 336 to a high pressure (H.P.) turbine 462. A control valve 464 in conduit 460 controls the flow of steam through conduit 460 and is capable of exiting steam through conduits 466 and 468 which respectively connect to and communicate with a steam seal regulator and a conduit, all to be identified hereafter. H.P. turbine 462 has a shaft (not shown) that is coupled to a generator 470. A L.P. (low pressure) turbine 472 is also engaged to the same shaft for further driving the generator 470 to produce electricity. As superheated steam enters the turbine 462 for operating and/or driving the same, an expansion of steam occurs. After driving the turbine 462, expanded steam exits the turbine 462 through the following conduits or lines: conduit 474, conduit 476, conduit 478, and conduit 480. Conduit 468 connects to conduit 474. Conduits 474, 478 and 480 respectively have valves 473, 477, and 479 respectively disposed therein for regulating the flow of expanded steam therethrough, and further respectively connect to and communicate with conduits 360, 358 and 356. Expanded steam passes through conduit 474 to also enter conduit 484 which leads to a reheater 486. Expanded steam is also capable of leaving conduit 484 through a conduit 485 which connects to conduit 362. Conduit 485 has a valve 487 for regulating flow therethrough. A conduit 492 connects to and communicates with the reheater 486 for conducting reheated steam from the reheater 486 to the turbine 472. When steam enters the low pressure turbine 472, expansion of the steam takes place within turbine 472. Expanded steam leaves the turbine 472 through the following conduits or lines: conduit 496; conduit 498; conduit 500; conduit 502; and conduit 504. Steam passing through conduit 496 enters a condenser 508 to condense the steam. A steam seal regulator 510 accepts steam from conduits 466 and 476. Conduit 512 transports steam from the steam seal regulator 510 to the condenser 508. Condensate leaves the condenser 508 through the conduit 516 where pump 518 pumps the condensate through conduit 520 to introduce the same into and/or through a heater 522. As shown in the lower part of FIG. 6, conduit 520 extends through heater 522, as well as through heaters 524, 526 and 528. Conduit 520 has a valve 521 therein for regulating flow. Each of the heaters 522, 524, 526 and 528 are basically a heat exchanger and produce an aqueous product that is passed, conducted and/or conveyed to the immediate preceding, contiguous heater or unit. More specifically, heater 528 produces an aqueous product that is conveyed to heater 526 via line or conduit 530. Similarly, heater 526 and heater 524 respectively produce an aqueous product that is conveyed to heaters 524 and 522 via line or conduit 532 and line or conduit 534 respectively. The aqueous product produced by heater 522 is conveyed to the condenser 508 via conduit 536. Expanded steam leaving the turbine 472 via conduits 498, 500, 502 and 504 is conveyed directly to heaters 522, 524 526 and 528, respectively. After leaving heater 528 conduit 520 connects to the conduit 400 of the nuclear generating plant 310.

Figure 4:
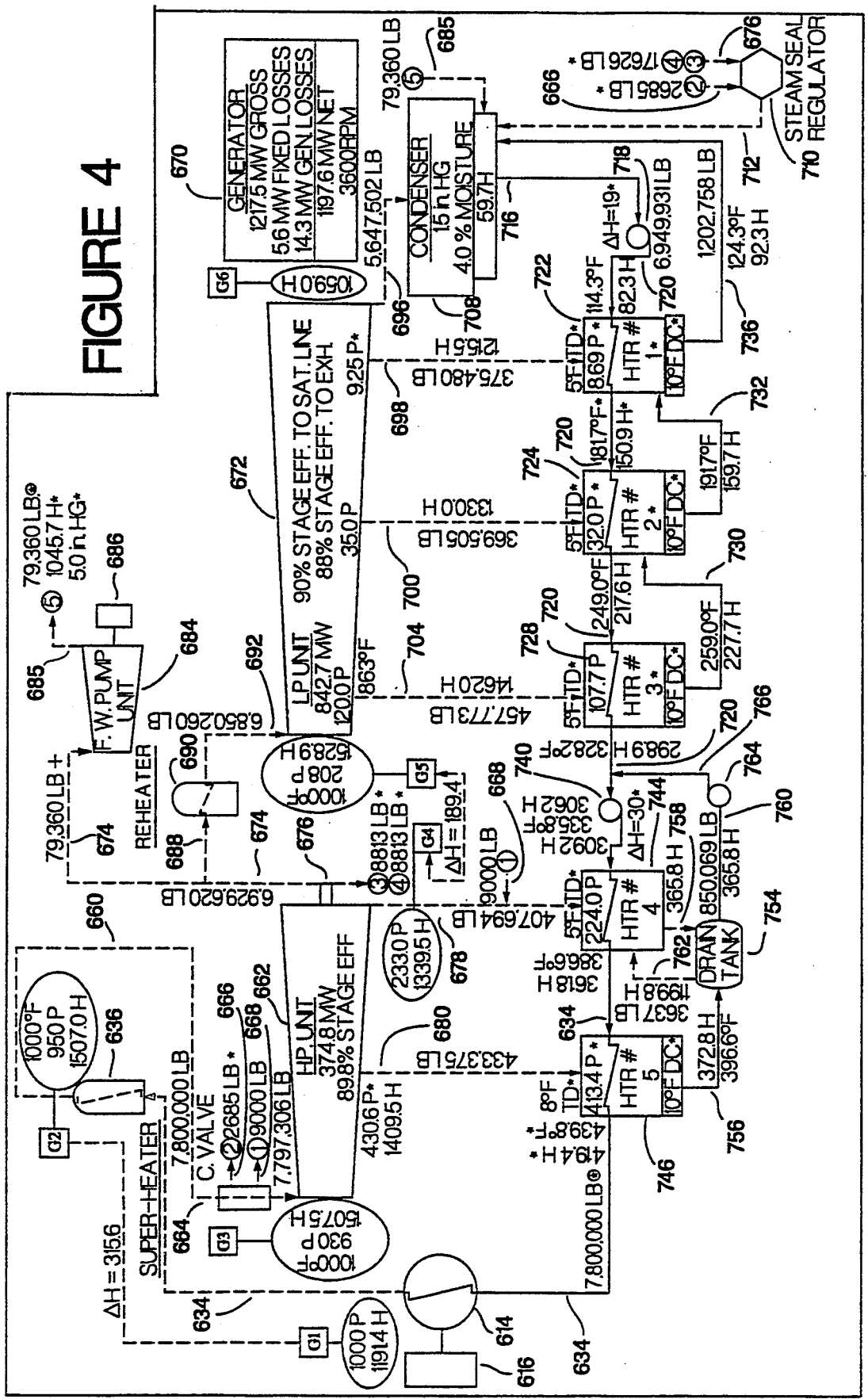
FIG. 4 is a schematic diagram of another embodiment of the present invention.

Referring in detail now to FIG. 4 for another embodiment of the present invention, there is seen a superheater 636 having a conduit 660 communicating therewith to lead superheated steam from the superheater 636 to a high pressure (H.P.) turbine 662. A control valve 664 in conduit 660 controls the flow of steam through conduit 660 and is capable of exiting steam through conduits 666 and 668 which respectively connect to and communicate with a steam seal regulator and a heater, all to be identified hereafter. H.P. turbine 662 has a shaft (not shown) that is coupled to a generator 670. A L.P. (low pressure) turbine 672 is also engaged to the same shaft for further driving the generator 670 to produce electricity. As superheated steam enters the turbine 662 for operating and/or driving the same, an expansion of steam occurs. After driving the turbine 662, expanded steam exits the turbine 662 through the following conduits or lines: conduit 674, conduit 676, conduit 678, and conduit 680. Expanded steam passes through conduit 674 to enter a feedwater turbine 684 for driving and operating a feedwater pump 686. Expanded steam leaves the feedwater turbine 684 through conduit 685. A conduit 688 connects to and communicates with conduit 674 for conducting expanded steam from conduit 674 to a reheater 690. Conduit 692 conveys reheated expanded steam from the reheater 690 to the turbine 672. When steam enters the low pressure turbine 672, expansion of the steam takes place within turbine 672. Expanded steam leaves the turbine 672 through the following conduits or lines: conduit 696; conduit 698; conduit 700; and conduit 704. Steam passing through conduit 696, as well as steam passing through conduit 685, enters a condenser 708 to condense the steam. A steam seal regulator 710 accepts steam from conduits 666 and 676. Conduit 712 transports steam from the steam seal regulator 710 to the condenser 708. Condensate leaves the condenser 708 through the conduit 716 where pump 718 pumps the condensate through conduit 720 to introduce the same into and/or through a heater 722. As shown in FIG. 4, conduit 720 extends through heater 722, as well as through heaters 724 and 728. Each of the heaters 722, 724, and 728 are basically a heat exchanger and produce an aqueous product that is passed, conducted and/or conveyed to the immediate preceding, contiguous heater or unit. More specifically, heater 728 produces an aqueous product that is conveyed to heater 724 via line or conduit 730. Similarly, heater 724 produces an aqueous product that is conveyed to heater 722 via line or conduit 732. The aqueous product produced by heater 722 is conveyed to the condenser 708 via conduit 736. Expanded steam leaving the turbine 672 via conduits 698, 700 and 704 is conveyed directly to heaters 722, 724 and 728 respectively. After leaving heater 728 conduit 720 connects to a pump 740 for pumping heated aqueous product (i.e. water) through a conduit 634 which extends through heaters 744 and 746 for further heating the heated aqueous product (i.e. water) and for passing or conveying further heated aqueous product into and through a steam generator 614. After conduit 634 passes through the steam generator 614, it connects to and communicates with the superheater 636. The steam generator 614 is operated by a nuclear reactor 616. Expanded steam leaving the turbine 662 via conduits 678 and 680 is conveyed directly to heaters 744 and 746 respectively. Conduit 668 conveys and introduces aqueous product into the conduit 678. As was seen for heaters 722, 724, and 728, heaters 744 and 746 are each also a heat exchanger and produce an aqueous product that is passed, conducted and/or conveyed to the immediate preceding, contiguous heater or unit. More particularly, heater 746 and 744 respectively produce an aqueous product that is conveyed to the drain tank 754 via line or conduits 756 and 758 respectively. Product leaves drain tank 754 through conduit 762 and 760 which connect to and communicate with heater 744 and a pump 764 respectively. A conduit 766 connects from pump 764 to conduit 720. Aqueous product is pumped by pump 764 through conduit 766 and to conduit 720.

Figure 8:
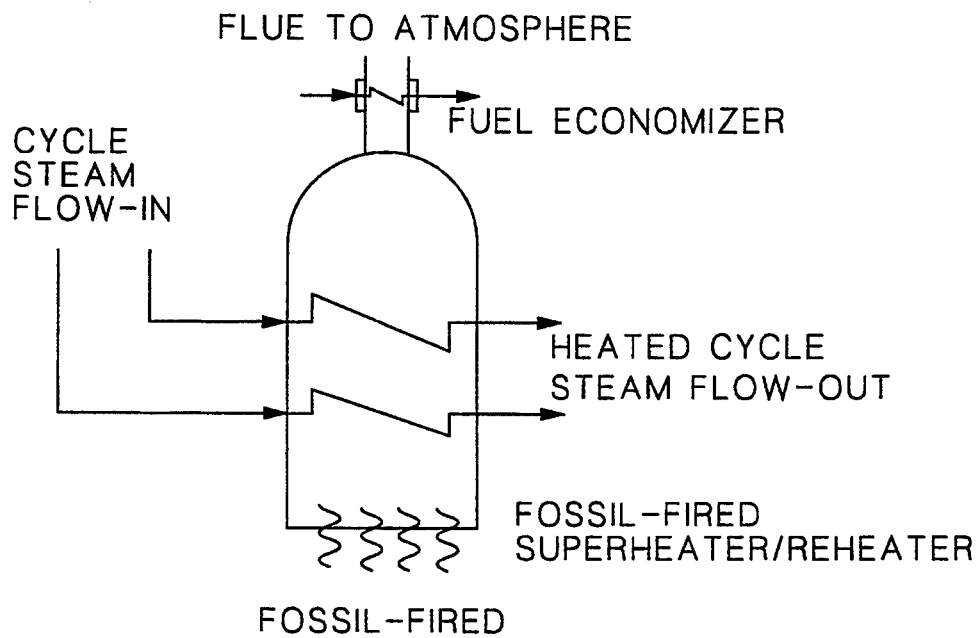
FIG. 8 is a design configuration of a fossil fired superheater or a fossil fired reheater.
Figure 9:
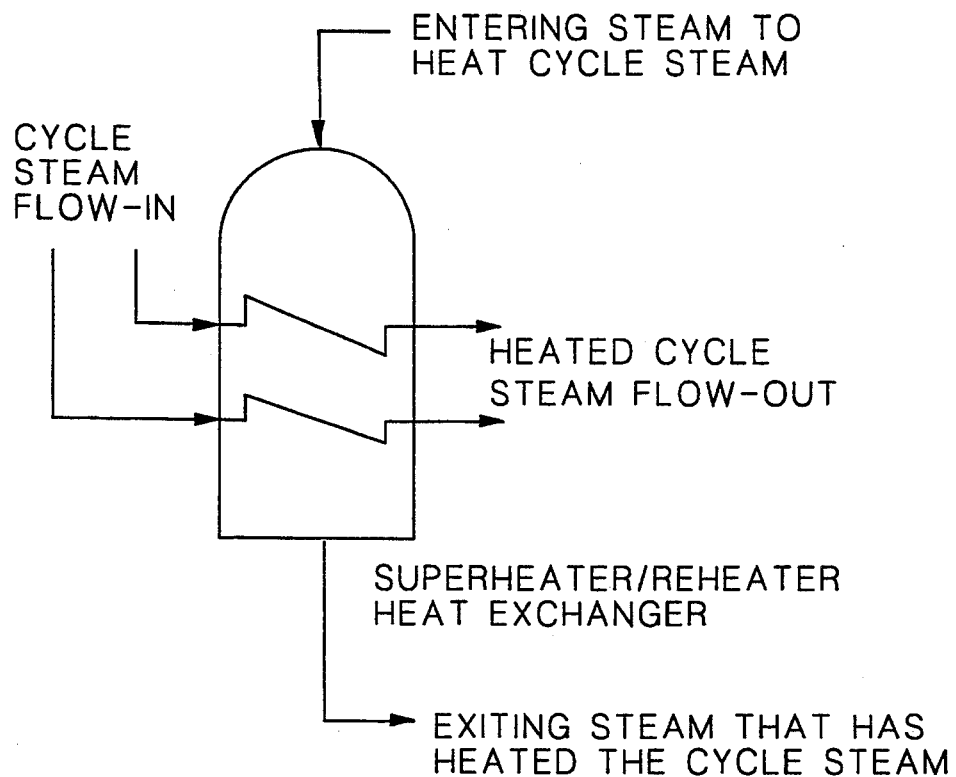
FIG. 9 is a design configuration of a steam to steam superheater or steam to steam reheater.

Referring now to FIGS. 8 and 9 for two possible embodiments of the superheaters (i.e. superheater 36 or superheater 636 or superheater 336) and/or of the reheaters (i.e. reheater 486 or reheater 690 or reheater 190), FIG. 8 illustrates a fossil fired superheater or a fossil fired reheater. Cycle steam flows into the fossil fired superheater or the fossil fired reheater through piping where heat from a fossil fire heats the piping (through a heat exchange process) containing the cycle steam. After the cycle steam is heated within the piping, it exits the superheater or the reheater as heated cycle steam. Use of the fossil-fired superheater/reheater is optional for a nuclear-fossil integrated power plant utilizing a pressurized water reactor. For safety reasons, the fossil-fired superheater/reheater shall not be used for a nuclear-fossil integrated power plant utilizing a boiling water reactor. The fossil-fired superheater/reheater can be constructed as a composite unit or as a separate unit. Optionally the feedwater may be heated by use of a fuel economizer. FIG. 9 illustrates a steam to steam superheater or steam to steam reheater. Cycle steam flows into the steam to steam superheater or the steam to steam reheater through piping where heat from an entering steam heats the piping (through a heat exchange process) containing the cycle steam. After the cycle steam is heated within the piping, it exits the superheater or the reheater as heated cycle steam. Use of the superheater/reheater heat exchanger is optional for a nuclear-fossil integrated power plant utilizing a pressurized water reactor. For safety reasons, the heat exchanger shall be used for a nuclear-fossil integrated power plant utilizing a boiling water reactor. The superheater/reheater heat exchanger can be constructed as a composite unit or as a separate unit. Optionally, the feedwater may be heated by use of a fuel economizer when a fossil-fired boiler is used.

My invention will be illustrated by the following set forth examples which are given by way of illustration and not by any limitation. All parameters such as distances, concentrations, temperatures, mixing proportions, pressures, flow-rates, heat rates, enthalpy, entropy, compounds, temperature rates, times, etc., submitted in these examples are not to be construed to unduly limit the scope of my invention.

The following three examples of the Nuclear-Fossil Integrated Power Plant invention are submitted for illustrative purposes only since other design innovations or embodiments are within the scope of the present invention. Such embodiments could include a fuel economizer for utilizing the fossil stack heat and/or a separate superheated steam loop as described below. Two of the embodiments or design innovations are presented in heat balance form with matching expansion lines shown on their respective Mollier diagrams. The design attributes are derived by comparing the Design innovation (Nuclear-Fossil Integrated Steam Cycle) to the original Nuclear Plant design information (Nuclear Steam Cycle). Utilizing the same feedwater flow to the steam generator and the original nuclear plant design configuration, the three embodiments and innovations are described and compared in the following Examples:

EXAMPLE I

General Arrangement

This example is directed to the embodiment of the invention in FIG. 1. In this design the heat balance sheet of the original plant configuration (Nuclear Steam Cycle) is shown in the upper diagram of FIG. 1. Valves and interconnect piping have been added and permits the directing of the steam flow from the steam generator 14 in Train #1 to either Train #1 via conduit 20 or to Train #2 via conduit 35.

Train #1 in FIG. 1 Operation Explanation

Figure 2:
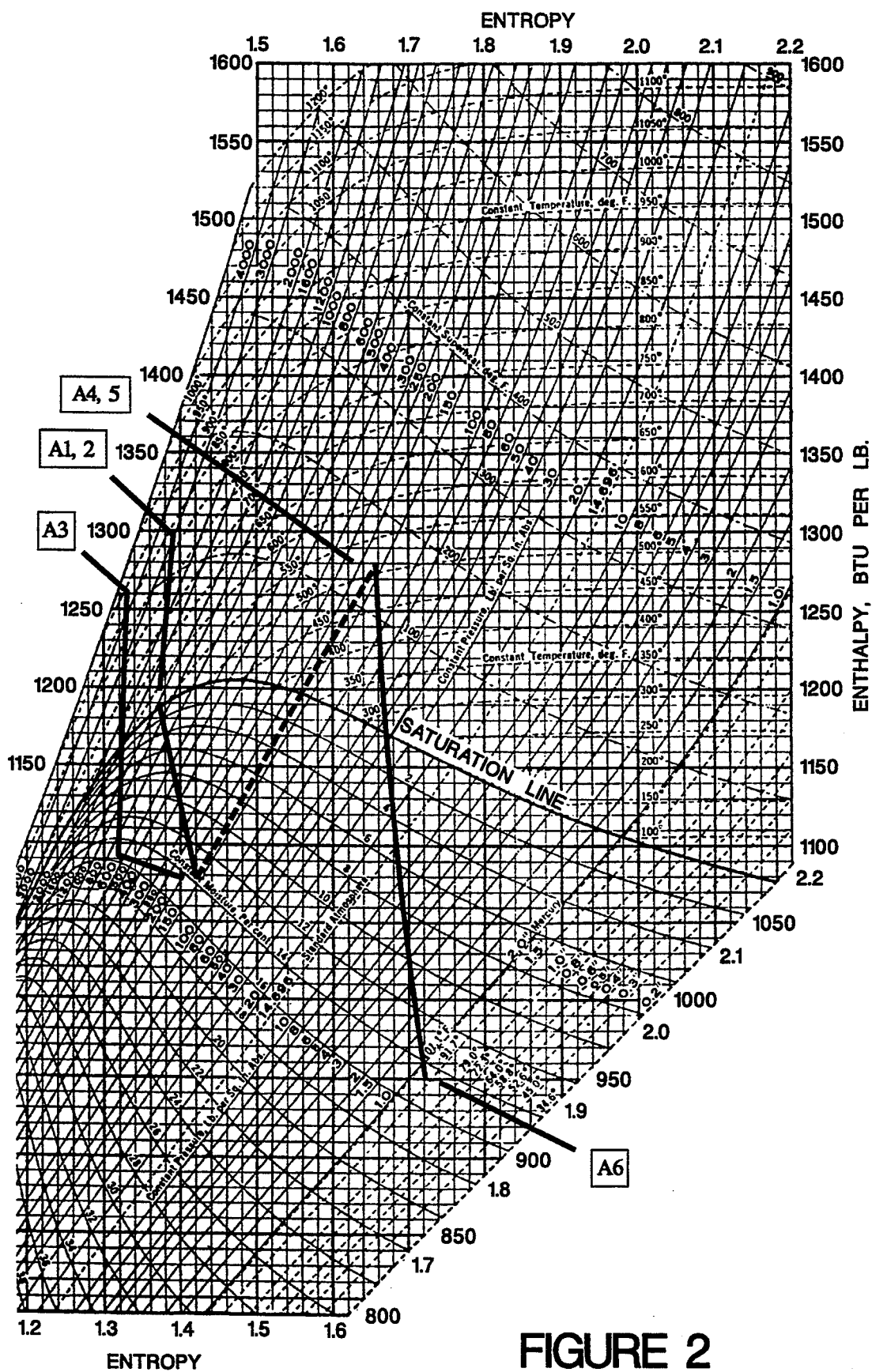
FIG. 2 is a Mollier diagram for the nuclear generating unit in FIG. 1.

When Train #1 is operated 15,136,752 lbs/hr of feedwater enters and exits the steam generator 14 via conduit 126. The steam coming from the steam generator 14 through conduit 20 is 1000 PSIA and is saturated (see A1 on the FIG. 1 diagram and on the Mollier diagram in FIG. 2). Valve 38 in conduit 35 is closed. Valve 2A is open which allows 913,081 lbs/hr of steam to flow to the second stage of the heat exchanger 22 and 14,223,671 lbs/hr of steam to flow through control valve 28 and enter the H.P. unit (turbine) 30 (see A2 in the upper part of FIG. 1 for steam conditions). The steam expands through the H.P. unit 30 to 175.3 PSIA (see A3 in the upper part of FIG. 1 for steam conditions). This expansion occurs below the saturation line and exits the H.P. unit 30 as wet steam. The Mollier diagram of FIG. 2 shows that the steam at A3 conditions has a 14% moisture content. It should be noted that the turbine blading in the H.P. unit 30 must be protected from the erosion effects of this moisture. Along the expansion path in the H.P. unit 30 steam @430.6 PSIA, @277.1 PSIA and @175.3 PSIA is respectively extracted through conduits 56, 58 and 60 for three feedwater heaters 132, 130 and 128 respectively and through conduit 48 for the 1st stage of the heat exchanger 22. This reheater or heat exchanger 22 extraction flow through conduit 48 is 485,233 lbs/hr The H.P. unit 30 generates in the generator 42 426.4 megawatts of power. The unit 22 shown between the H.P. unit (turbine) 30 and the L.P. unit (turbines) 44 is a combination moisture separator and heat exchanger 22. 1,687,414 lbs/hr of water (moisture) is separated in the moisture separator via conduit 64 resulting from the H.P. unit 30 exit flow through conduit 50 (shown as 12,030,591 lbs./hr) thus reducing the flow of steam through conduit 62 to 10,343,177 lbs/hr. After this moisture removal, the steam is saturated steam and its enthalpy condition is shown on the Mollier diagram in FIG. 2 where the dotted line between A3 and A4,5 crosses the saturation line at an enthalpy of about 1196.2 H in BTU/lb. This value of 1196.2 H is listed in the entrance of the 1st stage of the heat exchanger 22 @172.1 PSIA. The reheater 22 is a 2 stage heat exchanger using the 485,233 lbs/hr of H.P. unit 30 extraction steam via conduit 18 in the 1st stage and 913,081 lb/hr of main steam via conduit 20 in the 2nd stage thus heating 10,343,177 lbs/hr of steam exiting the heat exchanger 22 through conduit 62 to a superheat condition with an enthalpy of about 1279.1 H (see A4 and A5 in the upper part of FIG. 1 for steam conditions). 193,860 lbs./hr of steam is channeled from conduit 62 via conduit 64 and is used to drive the F. W. Pump Unit 66/68 (193,860 lbs/hr) and 10,149,317 lbs./hr of steam enters the L.P. unit 44 (10,149,317 lbs/hr) via conduit 62. Along the expansion path in the L.P. unit 44, steam is extracted via conduits 84, 82, 80 and 78 respectively for 4 feedwater heaters 108, 106, 104 and 102 respectively at the respective pressure of @98.7 PSIA, @59.7 PSIA, @18.7 PSIA and @9.25 PSIA. Additionally moisture is separated through conduit 76 @4.9 PSIA (187,921 lbs/hr) from the steam flow path. The steam exits the L.P. unit 44 with high moisture content (see A6 in the upper part of FIG. 1 for steam conditions). The L.P. unit 44 generates in the generator 42 780.3 megawatts. Train #1 in FIG. 1 generates a net total of 1185.8 megawatts of power with a heat rate of about 9854.6 BTU/KWH. This heat rate represents an efficiency of about 34.6%.

Train #2 in FIG. 1 Explanation

Figure 3:
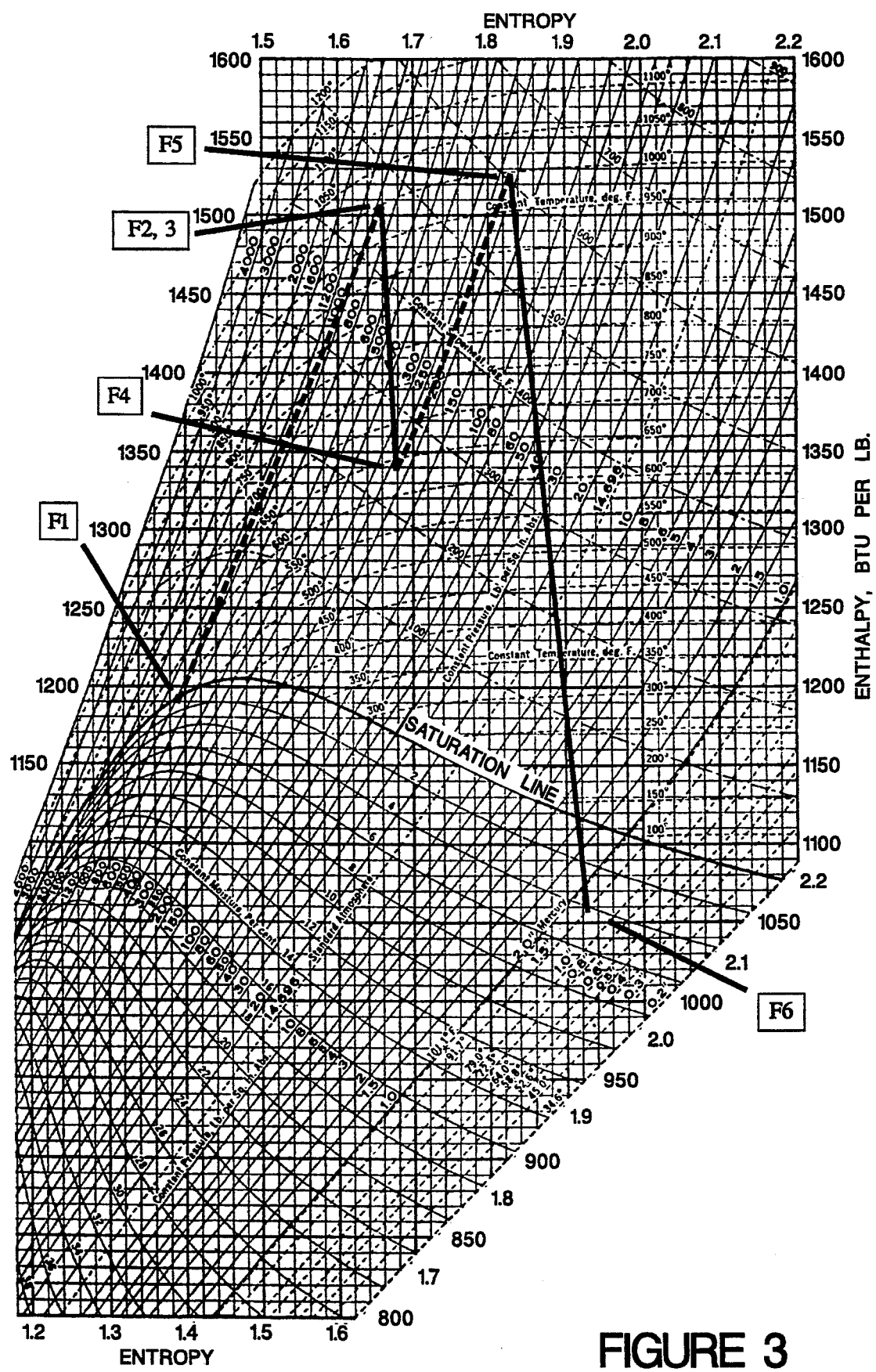
FIG. 3 is a Mollier diagram for the improved addition or upgrade addition in FIG. 1.

Train #2 in FIG. 1 provides a Nuclear-Fossil Integrated Steam Cycle by directing saturated steam from Train #1 via conduit 35 to Train #2 (see F1 on the upper part of FIG. 1 for steam condition) with valve 24 and valve 38 open. The steam flows to the super-heater 36 in Train #2. (Note: In the pressurized water reactor plant the superheater 36 and reheater 190 (previously described) are heat exchangers with heat being provided by a fossil-fired firebox (see FIG. 8) or a separate superheated steam loop (see FIG. 9). If the steam generator 14 utilizes a boiling water reactor, the superheater 36 and the reheater 190 (previously described) utilizes a separate superheated steam loop. This loop is shown on the conceptual design configuration FIG. 9. The superheater 36 heats the saturated steam from conduit 35 to a superheated condition of 1000° F. (see F2 on the lower part of FIG. 1 for steam conditions). In turn, the steam enters the Train #2 H.P. unit through conduit 160 @1000° F. and 930 PSIA (see F3 on the lower part of FIG. 1 for the steam conditions). It is noteworthy to mention that all of the feedwater is heated to a superheated steam condition by the superheater 36 and is delivered to the H.P. unit 162 via conduit 160. In the Train #1 configuration (original design) 14,223,671 lbs/hr enters the H.P. unit 30 from conduit 26. In the Train #2, 15,136,752 lbs/hr enters the Train #2 H.P. unit 162 from conduit 160. This increased flow coupled with the use of superheated steam generates 727.9 megawatts in the generator 170 from the Train #2 H.P. unit 162. The Train #1 H.P. unit 30 generates 426.4 megawatts. Additionally the slope of the extraction line on the FIG. 2 and 3 Mollier diagram is an indication of the turbine efficiency, 87.0% for Train #1 H.P. unit 30 and 89.8% for Train #2 H.P. unit 162. (This is due to the lack of moisture in the steam. The efficiencies are noted on the heat balance diagram of FIG. 1). Since the Train #2 H.P. unit 162 utilizes superheated steam, the erosion effect of moisture in the steam that exists during the Train #1 H.P. unit 30 operation is nonexistent during Train #2 H.P. unit operation 162, thus a 3600 rpm unit is used. Only 2 feedwater heaters 246 and 244 are utilized since the extraction steam has a higher heat content. The H.P. unit 162 exit pressure of about 233 psa is higher (see F4 in the lower part of FIG. 1 for steam conditions) than the exit pressure from H.P. unit 30 (see A3 on FIG. 1 for steam conditions). After exiting the H.P. unit 162 (see F4 in the lower part of FIG. 1 for steam conditions) the steam enters the reheater 190 and is reheated to 1000° F., 208 PSIA (see F5 in the lower part of FIG. 1 for steam conditions). The steam flows through conduit 192 and is expanded through the L.P. unit 172 and utilizes 4 extraction conduits 204, 202, 200 and 198 to respectively direct expanded steam to 4 L.P. heaters 228, 226, 224 and 222 respectively at the pressures designated on FIG. 1. The steam exits at 4% moisture (see F6 in the lower part of FIG. 1 for steam conditions). This permits the use of a 3600 rpm unit. The power output is 1641.9 megawatts. The expansion line for Train #2 shows a large amount of available heat (1528.9−1059.0); that is a delta enthalpy of about 469.9 H. Train #1 has a delta enthalpy of about 323.9 H (1279.1−955.2) available. Additionally the flow to Train #2 L.P. unit 172 is about 13,289,477 lb/hr. Train #1 L.P. unit 44 steam thereto through conduit 50 flow is about 10,149,317 lb/hr operating as a nuclear steam cycle. The result is that the Train #1 generates about 1185.8 megawatts wherein Train #2 operating as a nuclear-fossil integrated steam cycle generates about 2330.0 megawatts, a 1144.2 megawatt increase which is a 96.5% increase.

Overall Design Attributes

The power is increased about 1144.2 megawatts, that is from 1185.8 megawatts to 2330.0 megawatts, a 96.5% increase.

The heat rate for the power increase (1144.2 megawatts) is 6374.9 BTU/KWH which is 53.5 efficiency. The average fossil plant has a heat rate of 8800 BTU/KWH (39.0% efficient). The Example I fossil fuel utilization represents a 27% fuel savings. (Note: a new high tech fossil plant design using a critical pressure and 1050°–1100° F. steam can be designed for a maximum of 42% efficiency—which is 8124 BTU/KWH).

Lower capital cost since 3600 rpm turbine-generator equipment is used.

Regulatory approval is simplified.

Construction of Fossil addition can be accomplished during plant operation and tie-in can be accomplished during normal refueling outage.

Train selection can be based on power demand.

Train selection can be switched when one train is not operable.

Train maintenance will not have to be accomplished during a refuel-maintenance outage; therefore outage time can be reduced from the usual 60–100 day refuel-maintenance outage to a refuel outage of 20 to 24 days for refueling the reactor. This will increase the availability factor. Additional maintenance and modification cost will be greatly reduced since the usual 600–800 man outage force will not be required since all maintenance and modifications can be accomplished on one train by utility maintenance and modification personnel while the other train is in use.

Each of the above attributes results in a substantial yearly gross income/profit increase.

EXAMPLE II

General Arrangement

Figure 7:
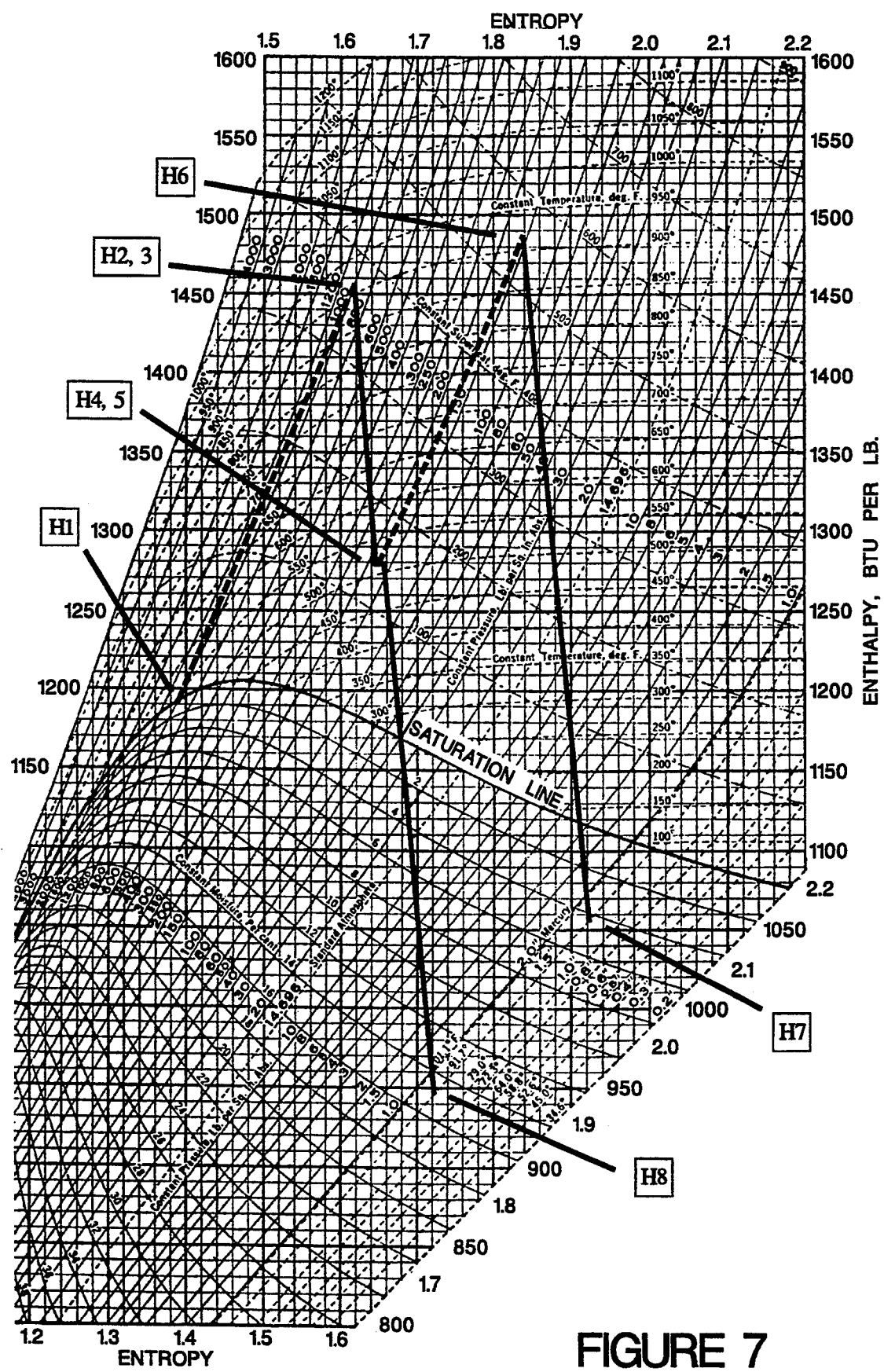
FIG. 7 is a Mollier diagram for the nuclear-fossil integrated design of FIG. 6.

This Example is directed to the embodiment of the invention in FIG. 6. In this design the heat balance sheet of the original plant configuration (nuclear steam cycle) is shown on the upper diagram of FIG. 6. In this embodiment, Train #2 operates simultaneously with Train #1. The upper diagram (Train #1) in FIG. 6 shows the original plant configuration modified with the necessary valves to permit the utilization of all the Train #1 feedwater heaters, (i.e. 402, 404, 406,4 08, 428, 430 and 432) and the use of the Train #1 L.P. unit (turbine) 344. Additionally metering valves are utilized to provide warming steam to the Train #1 piping, the Train #1 reheater or heat exchanger 322 and the Train #1 H.P. unit (turbine) 330. Additionally it should be noted that in the FIG. 6 the exit steam temperature from the superheater 336 has been selected to assure the exit steam conditions from the Train #2 H.P. unit (turbine) 462 are about the same as reheater or heat exchanger 322 steam conditions when Train #1 is operated in the original design configuration or nuclear steam cycle to permit use of the Train #1 L.P. unit. These steam conditions are pictorial evidenced on the Mollier diagrams (see A4, 5 in FIG. 2) and H 4,5 in FIG. 7). The FIG. 6 Design Innovation results in a lower total capital cost since the feedwater heaters and the L.P. unit 344 in Train #1 are all utilized.

This arrangement permits the directing of saturated steam flow from the steam generator 314 in Train #1 to either Train #1 (thus functioning as the original nuclear steam cycle) or to Train #2 superheater 336 (thus functioning as the nuclear-fossil integrated steam cycle or a Train 1–Train 2 composite unit).

Train #1 in FIG. 6 Operation Explanation

The FIG. 6 Heat Balance Diagram shows the valve positions for the Train #1–Train #2 composite operation. For the Train #1 operation, each of the valves 338, 479, 477, 473, 487 and 521 are changed from open to a closed position therefore Train #1 will function in accordance with original design configuration (nuclear steam cycle). A detailed description of the FIG. 6 Train #1 fluid flows, fluid conditions, and power generation, etc. operating as a nuclear steam cycle is given in the previously mentioned FIG. 1 Train #1 operation explanation of Example I.

Train #1–Train #2 Composite Unit in FIG. 6 Operation Explanation

As explained in the "General Arrangement" paragraph above, the Train #1 feed water heaters (i.e. 402 etc.) and Train #1 L.P. unit 344 are utilized and the Train #1 piping, the Train #1 reheater 322 and Train #1 H.P. unit 330 are provided with warming steam. Additionally the saturated steam (see H1 in FIG. 6 for steam conditions as well as on the FIG. 7 Mollier diagram) is directed through conduit 335 from the Train #1 steam generator 314 to the Train #2 superheater 336. The Train #1 steam generator 314 receives from conduit 426 about 15,136,752 lbs/hr of feedwater, and subsequently generates about 15,136,752 lbs/hr of saturated steam @1,000 PSI. About 69,561 lbs/hr of steam is directed through conduit 326 to the Train #1 H.P. unit 330 and about 10,000 lbs/hr of steam is directed via conduit 320 to the Train #1 reheater or heat exchanger 332, thus about 15,057,191 lbs/hr of steam enters the Train #2 superheater 336. The 15,057,191 lb/hr exits the Train #2 superheater 336 @920° F. and 950 PSIA (see H2 in FIG. 6 for steam conditions). Note: In the pressurized water reactor plant the superheater and reheater (previously described) are heat exchangers with heat being provided by a fossil-fired fire box or a separate superheated steam loop utilizing a fossil-fired fire box. If the steam generator 314 utilizes heat from a boiling water reactor, the superheater and reheater (previously described) utilizes a separate superheated steam loop utilizing a fossil-fired fire box. This loop is shown on the conceptual design of FIG. 9. In turn, the steam enters the Train #2 H.P. unit 462 from conduit 460 @930 PSIA (see H3 in FIG. 6 for steam conditions). The steam expands through the H.P. unit 462 to 175.3 PSIA (see H4 in FIG. 6 for steam conditions). It is noteworthy to mention that in the Train #1 FIG. 1 design configuration, 14,223,671 lbs/hr enters the H.P. unit 30 but in the FIG. 6 Train #2 H.P. unit 462 15,057,191 lbs/hr enters H.P. unit 462 through conduit 460. This increased flow coupled with the use of superheated steam generates 784.4 megawatts in the Train #2 H.P. unit 462. The FIG. 1 Train #1 H.P. unit 30 when operated in the nuclear steam cycle (original design) generates 426.4 megawatts. Additionally the slope of the extraction line on the Mollier diagram is an indication of the turbine efficiency, 87.0% for FIG. 1 Train #1 H.P. unit and 89.8% for FIG. 6 Train #2 H.P. unit. (This is due to the lack of moisture in the steam. The efficiencies are noted on the Heat balance diagram of FIGS. 1 and 6). Since the Train #2 H.P. unit 462 utilizes superheated steam, the erosion effect of moisture in the steam that exists during the Train #1 H.P. unit 330 operation is non-existent during the Train #2 H.P. unit 462 operation; thus a 3600 rpm unit is used. Steam is extracted from the Train #2 H.P. unit 462 and is respectively directed to the Train #1 feedwater heaters 432, 430 and 428 respectively via conduit 480, 478 and 474 respectively. Additionally saturated steam which was metered to the Train #1 H.P. unit 330 and to Train #1 reheater 322, flows from the H.P. unit 330 to the heaters (i.e. 432,430,etc.) as shown on the FIG. 6 heat balance diagram. At the exit of the Train #2 H.P. unit 462 the exit enthalpy and pressure is about the same as the Train #1 design configuration reheater exit or heat exchanger 22 conditions, (see H4 in FIG. 6 and A4 in FIG. 1). This flow enters the FIG. 6 Train #1 L.P. unit 344 respectively @160 PSIA, 1279.1 H (enthalpy). (see H5 in FIG. 6) The exit flow from the FIG. 6 Train #2 H.P. unit 462 is 13,783,141 lbs/hr (13,219,126+564,015). To duplicate the design configuration flow to the Train #1 H.P. unit and to the feedwater pump unit, the Train #2 H.P. unit 462 exit flow through conduit 474 is split. 10,343,177 lb/hr is directed through conduits 474 and 485 to Train #1 and the balance of the flow (2,836,266 lbs/hr) is directed through conduits 484 to the Train #2 reheater 486. 10,149,317 lbs/hr of steam from conduit 362 is expanded through the Train #1 L.P. unit 344. Extracted steam via conduits 378, 380, 382, and 384 provides steam or heat for the Train #1 heaters (i.e. heaters 402, 404, 406, and 408). The steam exits through conduits 374 and 376 into the Train #1 condenser 388 (see H8 in FIGS. 6 and 7 for the steam conditions), and about 780.3 megawatts of power are generated by generator 344. The Train #2 reheater 486 steam flow (2,886,266 lbs/hr) enters the Train #2 L.P. unit 472 @150 PSIA, 920° F., 1489.0 H (see H6 in FIGS. 6 and 7 for the steam conditions). The steam is expanded through the Train #2 L.P. unit 472. Extraction steam via conduits 498, 500, 502 and 504 respectively supplies heat to the Train #2 L.P. heaters (522,524,525 and 528). The steam exits via conduit 496 into the Train #2 condenser 508 (see H7 in FIGS. 6 and 7 for the steam conditions). The steam exits @4% moisture which permits the use of a 3600 rpm unit. 321 megawatts of power are generated in the Train #2 L.P. unit 472. The expansion line on the FIG. 7 Mollier diagram shows a large amount of available heat. This along with the increased flow within the turbine units results in a total power production increase. The power production of FIG. 1 Train #1 operating as a Nuclear steam cycle (original configuration) generates 1185.8 megawatts, wherein the composite unit in FIG. 6 operating as Nuclear-Fossil integrated steam cycle generates 1856.6 megawatts, a 670.8 megawatts increase which is a 56.6% power increase.

Example II Overall Design Attributes

The power is increased 670.0 megawatts, that is from 1185.8 megawatts to 1856.6 megawatts, a 56.6% increase.

The heat rate for the increased power (670.0 mw) is 6981.7 BTU/KWH which is 48.9% efficient. The average fossil plant has a heat rate of 8800 BTU/KWH (39.0% efficient). The FIG. 6 fossil fuel utilization represents a 21% fuel savings. (Note: A new high tech fossil plant design using critical pressure and 1050°–1100° F. steam can be designed for a maximum of 42% efficiency—which is 8024 BTU/KWH).

Lower capital cost since 3600 rpm turbine-generator equipment may be utilized.

Regulatory approval is simplified.

Train selection can be based on power demand.

Each of the above attributes results in a substantial yearly gross income/profit increase.

EXAMPLE III

General Arrangement

Figure 5:
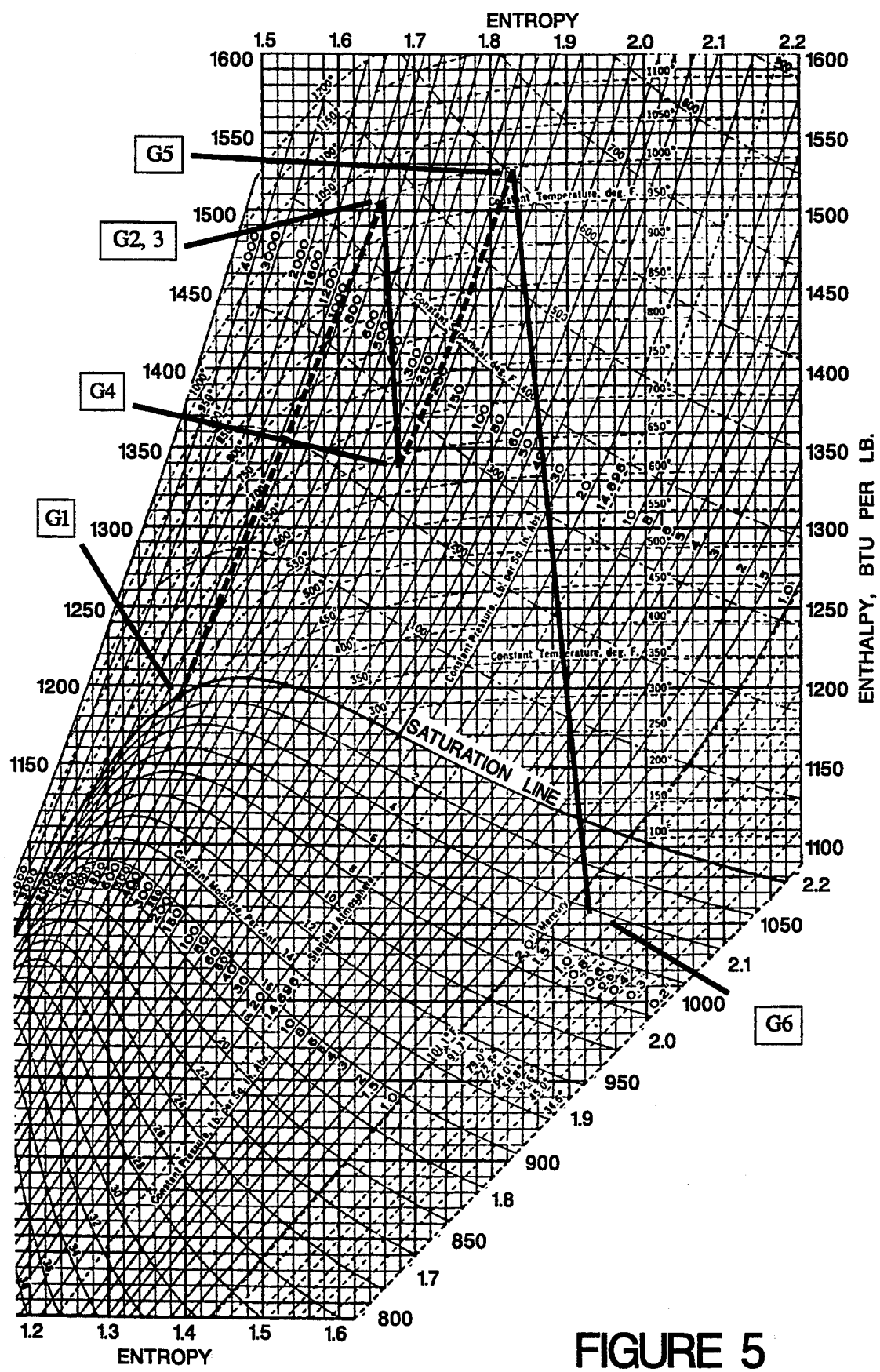
FIG. 5 is a Mollier diagram for the nuclear-fossil integrated design of FIG. 4.

The Example is directed to the embodiment of the invention in FIGS. 4 and 5. The general arrangement of this innovation is as follows:

Nuclear operated steam generator 614 is employed having a feedwater flow therethrough via conduit 634 of about 7,800,000 lbs/hr.

The steam generator 614 uses a U-tube design. Therefore the exit steam generator steam conditions via conduit 634 utilized in the FIG. 4 heat balance is 1000 PSIA saturated steam and the entrance feedwater temperature into steam generator 614 via conduit 634 is 439.8° F.

Five feedwater heaters 722, 724, 728, 744, and 746 have been utilized.

Additionally FIG. 4 employs a steam superheater 636, and a reheater 690, and superheater and reheater temperatures and pressure drops, piping and control valves, gland leakages, operating pressures and turbine efficiencies are all used as suggested on the previous examples. 3600 RPM turbines are utilized and the expansion line shown on the Mollier Diagram in FIG. 5 is identical to the FIG. 1 expansion line, with condenser pressure of 1.5 in Hg and L.P. unit 672 exit steam @4% moisture. The heat balance diagram in FIG. 4 and Mollier diagram in FIG. 5 with the expansion line are all illustrated.

FIG. 4 Operation Explanation 7,800,000 lbs/hr of feedwater @439.8° F. enters the steam generator 614 via conduit 634 and exits @1000 PSIA (see G1 in FIGS. 4 and 5 for steam conditions) and is saturated steam. The 7,800,000 lbs/hr of saturated steam is piped to the superheater 636 via conduit 634 and heated to 1000° F. (see G2 in FIGS. 4 and 5 for steam conditions). 7,797,306 lbs/hr enters the H.P. unit (turbine) 662 through conduit 660 (see G3 in FIGS. 4 and 5 for steam conditions) and exits @233.0 PSIA (see G4 in FIGS. 4 and 5 for steam conditions). Two steam extractions through conduits 678 and 680 occur within the H.P. unit 662 for feedwater heating in heaters 744 and 746. The H.P. unit 662 causes the generator 670 to generate 374.8 megawatts. The H.P. unit 662 exit steam via conduit 674 is utilized for the feedwater pump turbine unit 684 and the balance (6,850,260 lbs/hr) is piped through conduit 688 to the reheater 690 which heats the steam to 1000° F. (see G5 in FIGS. 4 and 5 for steam conditions). 6,850,260 lbs/hr of steam enters the L.P. unit 672 and exits the L.P. unit 672 via conduit 696 @1.5 inches of $H_g$ and 4% moisture (see G6 in FIGS. 4 and 5 for steam conditions). Three extractions occur via conduits 698, 700 and 704 respectively within the L.P. unit 672 for feedwater heating of feedwater passing through conduit 720 which extends through heaters 722, 724 and 728. The L.P. unit 672 cause the generator 670 to generate 842.7 megawatts. This Example operates as a nuclear-fossil integrated steam cycle and produces 1197.6 megawatts. Since this Example produces 1197.6 megawatts, this is an increase of 597.6 megawatts a 99.6% increase over a nuclear steam cycle which utilizes saturated steam and with a moisture separator/reheater. (Note: such a unit would produce 600 megawatts).

FIG. 4 Overall Design Attributes

The power is increased 597.6 megawatts; that is from 600 megawatts to 1197.6 megawatts, a 99.6% increase.

The heat rate for the increased power (597.6 MW) is 6296.9 BTU/KWH which is 54.2% efficient. The average fossil plant has a heat rate of 8800 BTU/KWH (39.0% efficient). The FIG. 4 fossil fuel utilization represents a 29% fuel savings. (Note: a new high tech fossil plant design using critical pressure and 1050°–1100° F. steam can be designed for a maximum of 42% efficiency which is 8124 BTU/KWH).

Lower capital cost since 3600 RPM turbine-generator equipment may be utilized in lieu of new generation nuclear plant 1800 RPM equipment.

Lower capital cost since single installation produces double the power.

Each of the above attributes results in a substantial yearly gross income/profit increase.

Thus by the practice of the present invention there is provided an apparatus and method that combines the best of the nuclear fueled and the fossil fired systems. The present invention utilizes the normal nuclear cycle for the generation of saturated steam. In turn, the saturated steam is superheated using a fossil fired or steam to steam superheater and utilizes the superheated steam in a 3600 RPM H.P. turbine. The H.P. turbine exhaust steam is then superheated in a fossil fired or steam to steam reheater and flows on to the L.P. turbine. This adds more heat for a given fluid flow, hence higher power production. Additionally, nuclear fuel is used for the water to steam transformation, hence the low cost fuel has been utilized for this major heat input. Since the superheating of the steam is accomplished using fossil fuel, the following advantages are obtained with the apparatus and method of the present invention: (1) the steam flow which was used for reheat in the conventional nuclear fueled system is available for power production in the practice of the present invention; and (2) the use of superheated steam made available by the nuclear-fossil integrated system permits more heat to be added to the fluid flow resulting in added power production and the use of 3600 RPM H.P. and L.P. turbines. In summary, the low cost nuclear BTU's are used for the "boiling" of the water into steam and the more costly fossil BTU's are used to superheat the steam.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A method for producing electrical power from steam generated by a nuclear reactor comprising the steps of:

(a) providing a nuclear reactor engaged to a steam generator for generating steam when heated aqueous product is passed therethrough;

(b) passing heated aqueous product through the steam generator of step (a) to produce steam;

(c) passing the produced steam of step (b) through a superheater to superheat the produced steam to a temperature where the produced steam has an enthalpy above about 1450 BTU per lb.;

(d) passing the superheated produced steam of step (c) through a first turbine to expand the superheated produced steam and produce steam having an enthalpy above about 1250 BTU per lb;

(e) reheating the produced steam of step (d) to obtain a reheated steam having an enthalpy above about 1470 BTU per lb.;

(f) passing the obtained reheated steam of step (e) through a second turbine coupled to a generator in order to expand the obtained reheated steam and generate electrical power with the generator;

(g) discontinuing the passing step (c) and subsequently bifurcating the produced steam of step (b) into a first steam stream and a second steam stream; passing the first steam stream through a heat exchanger; passing the second steam stream through a third turbine to expand the second steam stream and produce an expanded second steam stream; dividing the expanded second steam stream into a first expanded second steam stream, a second expanded second steam stream; and a third expanded second steam stream; passing the first expanded second steam stream through said heat exchanger; passing the second expanded second steam stream into said heat exchanger to heat the same through a heat exchange relationship with the first steam stream and the first expanded second steam stream and produce a heated second expanded second steam stream; passing the third expanded second steam stream through a third heater; passing the reheated second expanded second steam stream through a fourth turbine coupled to a second generator to expand the heated second expanded second steam stream, causing the second generator to generate electricity and produce an expanded heated second expanded second steam stream.

2. A method for producing electrical power from steam generated by a nuclear reactor comprising the steps of:

(a) providing a nuclear reactor engaged to a steam generator for generating steam when heated aqueous product is passed therethrough;

(b) passing heated aqueous product through the steam generator of step (a) to produce steam;

(c) passing the produced steam of step (b) through a superheater to superheat the produced steam;

(d) passing the superheated produced steam of step (c) through a first turbine to expand the superheated produced steam and produce steam;

(e) reheating the produced steam of step (d) to obtain a reheated steam;

(f) passing the obtained reheated steam of step (e) through a second turbine coupled to a generator in order to expand the obtained reheated steam and generate electrical power with the generator;

(g) discontinuing the passing step (c) and subsequently bifurcating the produced steam of step (b) into a first steam stream and a second steam stream; passing the first steam stream through a heat exchanger; passing the second steam stream through a third turbine to expand the second steam stream and produce an expanded second steam stream; dividing the expanded second steam stream into a first expanded second steam stream, a second expanded second steam stream; and a third expanded second steam stream; passing the first expanded second steam stream through said heat exchanger; passing the second expanded second steam stream into said heat exchanger to heat the same through a heat exchange relationship with the first steam stream and the first expanded second steam stream and produce a heated second expanded second steam stream; passing the third expanded second steam stream through a third heater; passing the reheated second expanded second steam stream through a fourth turbine coupled to a second generator to expand the heated second expanded second steam stream, causing the second generator to generate electricity and produce an expanded heated second expanded second steam stream.

3. The method of claim 1 additionally comprising recovering expanded steam from the second turbine, said recovered expanded steam from the second turbine having an enthalpy greater than about 1050 BTU per lb.; condensing the recovered expanded steam into an aqueous product; passing the aqueous product through a first pump to pump the aqueous product to produce a pumped aqueous product; passing the pumped aqueous product through at least one first heater to produce an aqueous product having an elevated temperature, an elevated pressure and elevated enthalpy; passing the aqueous product having an elevated temperature, pressure and enthalpy through a second pump; passing subsequently the aqueous product from the second pump through at least one second heater to produce said heated aqueous product which is for being passed through the steam generator.

4. The method of claim 2 additionally comprising recovering expanded steam from the second turbine, said recovered expanded steam from the second turbine having an enthalpy greater than about 1050 BTU per lb.; condensing the recovered expanded steam into an aqueous product; passing the aqueous product through a first pump to pump the aqueous product to produce a pumped aqueous product; passing the pumped aqueous product through at least one first heater to produce an aqueous product having an elevated temperature, an elevated pressure and elevated enthalpy; passing the aqueous product having an elevated temperature, pressure and enthalpy through a second pump; passing subsequently the aqueous product from the second pump through at least one second heater to produce said heated aqueous product which is for being passed through the steam generator.

5. The method of claim 1 additionally comprising passing part of the produced steam of step (d) to a feed water pump to operate the same.

6. The method of claim 2 additionally comprising passing part of the produced steam of step (d) to a feed water pump to operate the same.

7. A method for producing electrical power from steam generated by a nuclear reactor comprising the steps of:

(a) providing a nuclear reactor engaged to a steam generator for generating steam when heated aqueous product is passed therethrough;

(b) passing heated aqueous product through the steam generator of step (a) to produce steam;

(c) bifurcating the produced steam of step (b) into a first produced steam stream and a second produced steam stream;

(d) passing the first produced steam stream of step (c) through a superheater to superheat the first produced steam stream;

(e) passing the superheated first produced steam stream of step (d) through a first turbine to expand the superheated first produced steam stream and produce an expanded superheated first produced steam stream;

(f) reheating the produced expanded superheated first produced steam stream of step (e) to obtain a reheated steam;

(g) passing the obtained reheated steam of step (f) through a second turbine coupled to a generator in order to expand the obtained reheated steam and generate electrical power with the generator;

(h) recovering expanded steam from the second turbine, said recovered expanded steam from the second turbine having an enthalpy greater than about 1050 BTU per lb.; condensing the recovered expanded steam into an aqueous product; passing the aqueous product through a first pump to pump the aqueous product to produce a pumped aqueous product; passing the pumped aqueous product through at least one first heater to produce an aqueous product having an elevated temperature, an elevated pressure and elevated enthalpy; passing the aqueous product having an elevated temperature, pressure and enthalpy through a second pump; passing subsequently the aqueous product from the second pump through at least one second heater to produce said heated aqueous product which is for being passed through the steam generator;

(i) bifurcating the second produced steam stream of step (C) into a first steam stream and a second steam stream; passing the first steam stream through a heat exchanger; passing the second steam stream through a third turbine to expand the second steam stream and produce an expanded second steam stream; dividing the expanded second steam stream into a first expanded second steam stream, a second expanded second steam stream; and a third expanded second steam stream; passing the first expanded second steam stream through said heat exchanger; passing the second expanded second steam stream into said heat exchanger to heat the same through a heat exchange relationship with the first steam stream and the first expanded second steam stream and produce a heated second expanded second steam stream; passing the third expanded second steam stream through a third heater; passing the reheated second expanded second steam stream through a fourth turbine coupled to a second generator to expand the heated second expanded second steam stream, causing the second generator to generate electricity and produce an expanded heated second expanded second steam stream.

8. The method of claim 7 additionally comprising an apparatus produced to accomplish the method steps.

* * * * *